(No Model.)

W. F. AUSTIN.
POTATO DIGGER.

No. 271,015.

3 Sheets—Sheet 1.

Patented Jan. 23, 1883.

WITNESSES:

INVENTOR:
W. F. Austin
BY Munn & Co
ATTORNEYS.

(No Model.)

W. F. AUSTIN.
POTATO DIGGER.

No. 271,015.  Patented Jan. 23, 1883.

WITNESSES:

INVENTOR:
W. F. Austin
BY
ATTORNEYS.

(No Model.)
W. F. AUSTIN.
POTATO DIGGER.
No. 271,015.   Patented Jan. 23, 1883.
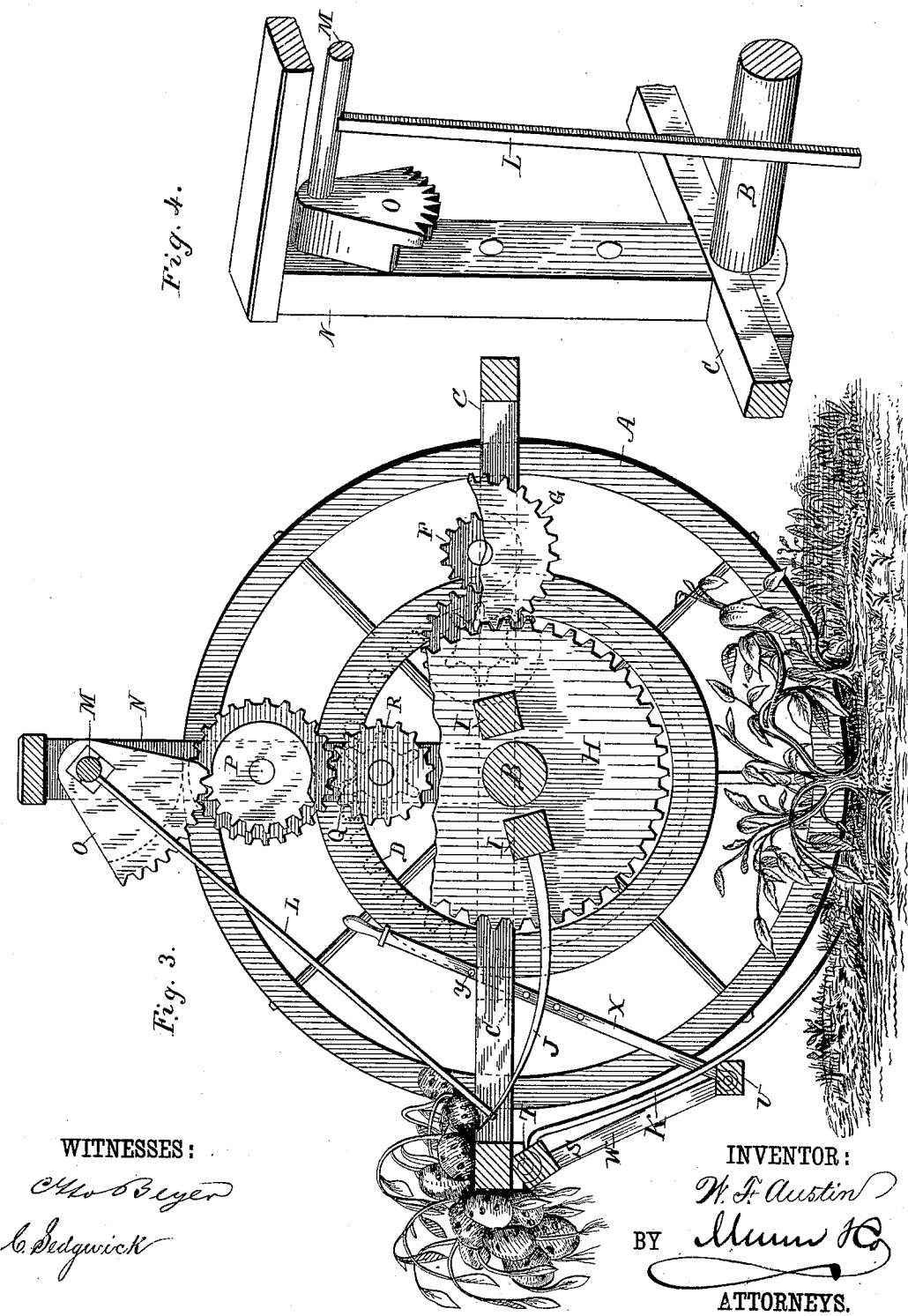
WITNESSES:
INVENTOR:
W. F. Austin
BY
ATTORNEYS.

UNITED STATES PATENT OFFICE.

WILLIAM F. AUSTIN, OF GREENBUSH, NEW YORK.

POTATO-DIGGER.

SPECIFICATION forming part of Letters Patent No. 271,015, dated January 23, 1883.

Application filed May 10, 1882. (No model.)

*To all whom it may concern:*

Be it known that I, WILLIAM F. AUSTIN, of Greenbush, in the county of Rensselaer and State of New York, have invented a new and Improved Potato-Digger, of which the following is a full, clear, and exact description.

My invention consists of apparatus mounted on and geared with the wheels of a truck, by which a set of digging-forks are made to revolve upon the axle and thrust into the ground in advance of the hill of potatoes to dig them out of the ground in front of a rake following behind said forks, and swing them up, said rake to separate them from the earth and discharge them over the top of said rake above the ground, and a gang of discharging-teeth suspended above the axle is made to swing backward along the forks as they pass above the rake to brush off any potatoes that may fail of discharging by the motion of the forks, as hereinafter described, and pointed out in the claims.

Reference is to be had to the accompanying drawings, forming part of this specification, in which similar letters of reference indicate corresponding parts in all the figures.

Figure 1:
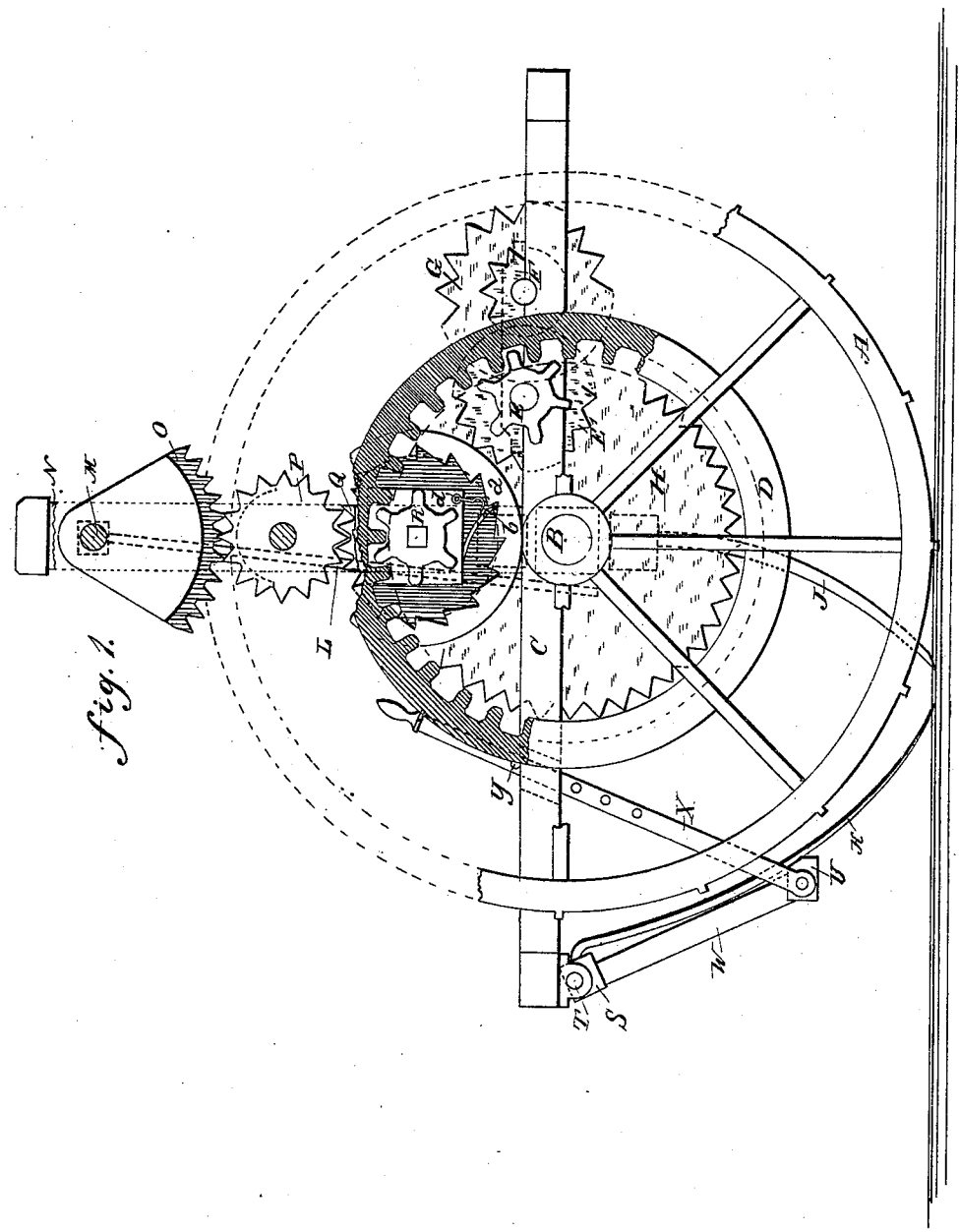
Figure 2:
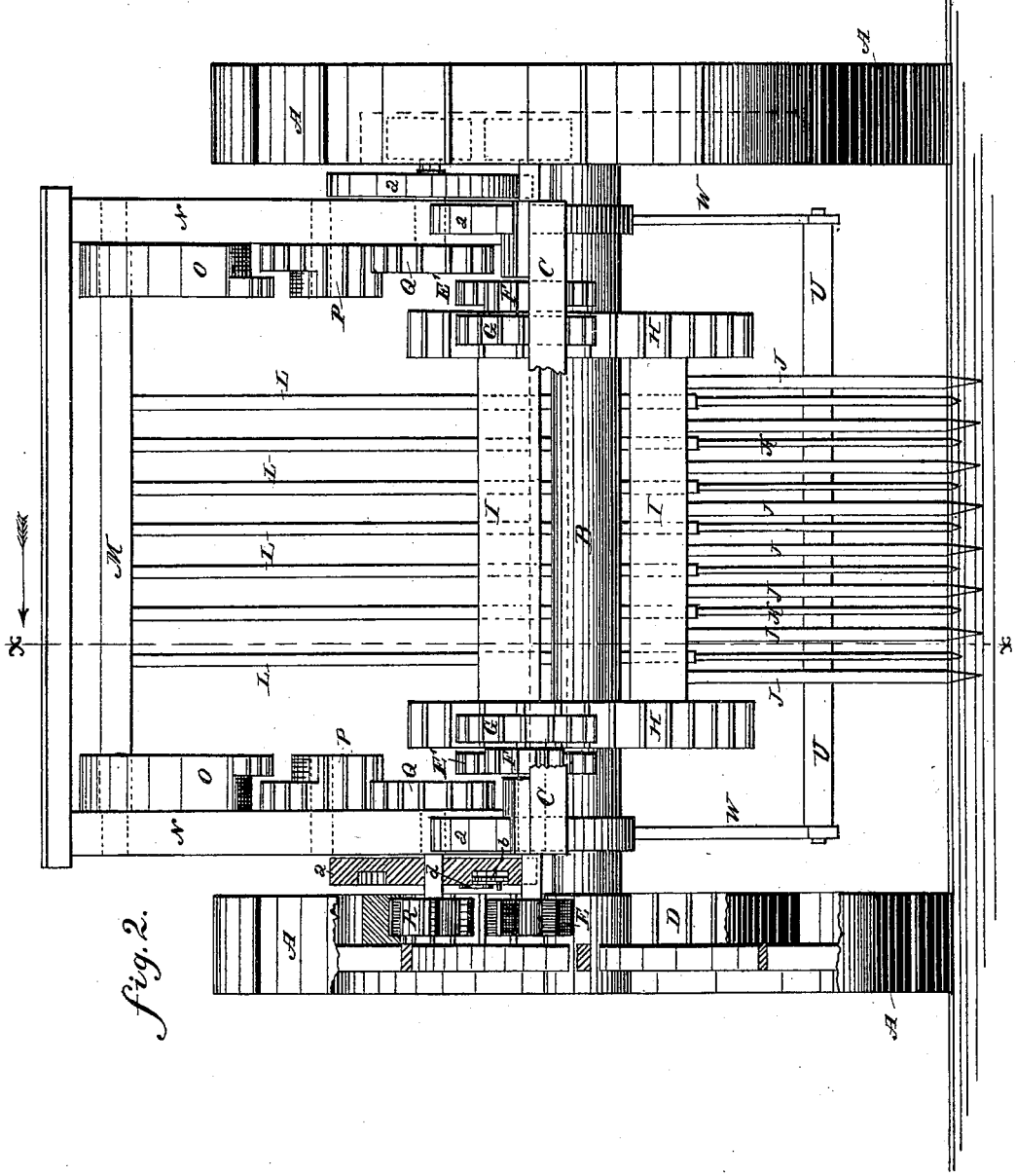

Figure 1 is partly a side elevation and partly a longitudinal sectional elevation of my improved potato-digger. Fig. 2 is partly a front elevation and partly a transverse section. Fig. 3 is a section on line $x\ x$ of Fig. 2, and Fig. 4 is a detail.

A represents a pair of wheels, which are to be three times as large in circumference as the distance between two rows of potatoes. They are mounted on an axle, B, carrying a suitable frame, C, and they have each a toothed wheel, D, gearing, by means of pinions E and intermediates E' F G, with wheels H, and a drum, I, revolving on the axle and carrying the digging-teeth J, the gears being speeded so that the said diggers J will revolve three times to one revolution of the truck-wheels, to be thrust into the ground in advance of the hills of potatoes for digging them out by their swing around the axle, and raising them up along the rake K, by which they are separated from the earth, and over which they are to be discharged by the thrust of diggers J or by the discharging-teeth L, which are suspended from a rock-shaft, M, mounted over the axle in the upright frame N, and geared, by the segmental wheels O, mutilated wheels P, and pinions Q and R, to the toothed wheels D of the truck-wheels, the segmental wheels O and the mutilated wheels P being so adjusted that they come into gear when the diggers arrive at the top of rake K, or a little sooner, and swing the dischargers L outward between the digger-teeth J, and throw off any potatoes that may lodge on them before they pass over to the front. The mutilated portions of wheels P then allow the segmental wheels to swing back to the starting-point, ready for the next round of the diggers, and so on.

The rake-teeth K are attached to a head, S, that is pivoted to the rear end of the truck-frame at T, to allow them to be let down more or less into the ground by a bar, U, against which they rest, and which is shifted up or down on pivots T by the arms W and adjusting hand-bars X, which are set higher or lower by means of pins Y, inserted in holes of bars X above the frame C, or equivalent means. By the same means the rake is supported above the ground for passing above it when not at work.

For disconnecting the gears that work the diggers, and also those that work the dischargers, I propose to employ ratchet-wheels $a$, in which the shafts of driving-pinions R and E will turn loosely and without effect, except when engaged by the pawls $b$, and the said pawls are to be disconnected from said ratchets and secured by hooks $d$ or other means when the forks and dischargers are not required to work. The ratchets and pawls are also so contrived that the truck-wheels will run backward without effect on the driving-gears, diggers, and dischargers, thereby protecting them from injury.

A suitable spring-seat may be provided for the operator of the machine, which seat may be connected either with the front, rear, or upper cross-bar of the frame.

Having thus fully described my invention, I claim as new and desire to secure by Letters Patent—

1. The combination, with the rotary diggers J, of the rock-shaft M, mounted on the axle in the upright frame N, and carrying the discharging-teeth L, and mechanism, substantially as described, for imparting a positive backward swing to the dischargers and allowing them to fall to the starting-point by gravity, as set forth.

2. The combination, with the drive-wheels A, provided with the toothed wheels D and the rotary diggers J, of the frame N, the rock-shaft M, carrying discharging-teeth L, segmental gears O, mutilated wheels P, and pinions Q and R, substantially as and for the purpose set forth.

3. The combination, with the frame C, the rotary diggers J, and the oscillating dischargers L, of the pivoted frame S U W, carrying the rake-teeth K, and forming a support for the lower ends thereof, and the adjusting hand-bars X, substantially as and for the purpose set forth.

4. The combination, with the rotary diggers J, of the rock-shaft M, mounted on the axle in the upright frame N, and carrying the discharging-teeth L, geared with the truck-wheels by gear-trains, for being operated thereby, the said trains having a ratchet-and-pawl device, $a$, $b$, and $d$, for disconnecting said diggers and dischargers, and for allowing back motion of the truck, substantially as described.

WILLIAM F. AUSTIN.

Witnesses:
LUKE SLADE,
FANNIE E. BROOKS.